United States Patent
Ryu

(10) Patent No.: US 8,336,068 B2
(45) Date of Patent: Dec. 18, 2012

(54) BROADCAST SIGNAL PROCESSING APPARATUS AND CHANNEL TUNING METHOD

(75) Inventor: Yang-sun Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 905 days.

(21) Appl. No.: 11/782,369

(22) Filed: Jul. 24, 2007

(65) Prior Publication Data

US 2008/0184292 A1 Jul. 31, 2008

(30) Foreign Application Priority Data

Jan. 30, 2007 (KR) ........................ 10-2007-0009327

(51) Int. Cl.
*G06F 13/00* (2006.01)
*H04N 7/173* (2006.01)
*H04N 5/50* (2006.01)

(52) U.S. Cl. .......... 725/38; 348/731; 348/705; 725/131; 725/139; 725/151

(58) Field of Classification Search .................... 725/38; 718/104
See application file for complete search history.

(56) References Cited

U.S. PATENT DOCUMENTS

| | | | |
|---|---|---|---|
| 6,133,910 A | | 10/2000 | Stinebruner |
| 6,927,806 B2 * | | 8/2005 | Chan ............................ 348/731 |
| 2004/0107451 A1 * | | 6/2004 | Khandelwal et al. ......... 725/146 |
| 2005/0044201 A1 * | | 2/2005 | Suzuki et al. ................. 709/223 |
| 2006/0020950 A1 * | | 1/2006 | Ladd et al. ..................... 719/328 |
| 2007/0089130 A1 * | | 4/2007 | Takagi et al. ................... 725/38 |
| 2007/0288972 A1 * | | 12/2007 | Lee et al. ...................... 725/100 |
| 2009/0055881 A1 * | | 2/2009 | Aoki et al. .................... 725/100 |

FOREIGN PATENT DOCUMENTS

| | | |
|---|---|---|
| JP | 2000-341596 A | 12/2000 |
| KR | 2004-0080018 A | 9/2004 |
| KR | 2005-0115656 A | 12/2005 |
| KR | 2006-0026489 A | 3/2006 |

OTHER PUBLICATIONS

Definition of "parallel" from www.dictionary.com.*

* cited by examiner

*Primary Examiner* — Jun Fei Zhong
(74) *Attorney, Agent, or Firm* — Sughrue Mion, PLLC

(57) ABSTRACT

A broadcast signal processing apparatus and channel tuning method are provided. The method comprises a host including Open Cable Application Platform (OCAP) middleware for communication with an application program provided from a broadcasting station, and a memory for storing programs and data. The method further includes: transferring the input channel tuning key signal to the application program and a service context portion in the OCAP middleware; creating a virtual inner channel map in the service context portion, and obtaining channel information from the virtual inner channel map; performing channel tuning in advance using the obtained channel information; searching the channel information by the application program; requesting channel tuning to the OCAP middleware with the searched channel information; judging whether the searched channel information is identical to the obtained channel information; and completing channel tuning by taking the advance tuning if both channel information are identical to each other.

11 Claims, 4 Drawing Sheets

BROADCAST SIGNAL PROCESSING APPARATUS AND CHANNEL TUNING METHOD

CROSS-REFERENCE TO RELATED APPLICATIONS

This application claims priority from Korean Patent Application No. 10-2007-0009327, filed on Jan. 30, 2007, in the Korean Intellectual Property Office, the disclosure of which is incorporated herein by reference.

BACKGROUND OF THE INVENTION

1. Field of the Invention

The present invention relates to a broadcast signal processing apparatus, and a channel tuning method, and more particularly, to a broadcast signal processing apparatus, and a channel tuning method, which can reduce a channel tuning time.

2. Description of the Related Art

Open Cable Application Platform (OCAP) is the U.S. cable broadcasting standard. Application Program Interfaces (APIs) and API implementations are called an OCAP middleware. Here, the APIs and API implementations are used to enable standard Java applications operating in the OCAP to control a host platform (for example, a digital television (DTV), a Set-Top Box, etc.) which observes the OCAP. In order for an application to perform channel tuning in this structure, the OCAP middleware receives a channel tuning key signal and hands over the received channel tuning key signal to the application, and the application requests for channel tuning to the OCAP middleware again.

FIG. 1 is a flowchart view schematically showing a channel tuning method in a related art broadcast signal processing apparatus equipped with OCAP middleware.

Referring to FIG. 1, if a user presses a channel tuning key using a remote controller 101 in a related art broadcast signal processing apparatus (for example, a DTV), a host platform 110 receives a channel tuning key signal. The host platform 110 having received the channel tuning key signal transfers the channel tuning key signal to OCAP middleware 120. The OCAP middleware 120 transfers the channel tuning key signal to an application program (for example, Java Application) 130. The application program 130 searches for channel information about a channel to be tuned using an inner channel map based on the received channel tuning key signal. The application program 130 then transfers the searched channel information about the channel to be tuned to the OCAP middleware 120 through a channel tuning function, which is called a select function in the OCAP standard, and requests for channel tuning. The OCAP middleware 120 having received a channel tuning request requests the host platform 110 to start the channel tuning.

According to the channel tuning method in the related art broadcast signal processing apparatus described above, channel tuning is not directly performed in the host platform 110. Rather, when the channel tuning key is input, the channel tuning key signal is transferred to the OCAP middleware 120 and the OCAP middleware 120 transfers the channel tuning key signal to the application program 130. The application program 130 then finds a service (channel) to be tuned based on the received channel tuning key signal and calls a channel tuning function to the OCAP middleware 120 to request channel tuning. The OCAP middleware 120 requests the host platform 110 to tune a channel desired by the application program 130. Accordingly, the host platform 110 starts a channel tuning operation.

As opposed to the existent analog mode TV, the method described above describes a DTV equipped with the OCAP middleware performs second through sixth steps (steps 2-6) until channel tuning actually starts. As a result, the related art DTV consumes time when performing second through sixth steps (steps 2-6), causing the channel tuning rate to decrease.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. The present invention provides a broadcast signal processing apparatus, and a channel tuning method therein, which can reduce channel tuning time, when a standard application, selected in a digital broadcasting system, requests for channel tuning through Open Cable Application Platform (OCAP) middleware.

According to an aspect of the present invention, there is provided a channel tuning method in a broadcast signal processing apparatus comprising a host, including an OCAP middleware for communication with an application program provided from a broadcasting station, and a memory for storing various programs and data, the channel tuning method comprising: if a channel tuning key signal is input by a user, transferring the input channel tuning key signal to the application program and a service context portion in the OCAP middleware, respectively; creating a virtual inner channel map in the service context portion, and obtaining channel information about a channel to be tuned in correspondence to the channel tuning key signal from the virtual inner channel map; performing channel tuning in advance using the obtained channel information about the channel to be tuned; searching the channel information about the channel to be tuned by the application program which has received the channel tuning key signal; sending a request for channel tuning to the OCAP middleware with the searched channel information about the channel to be tuned; judging whether the searched channel information with which the application program has requested for the channel tuning is identical to the obtained channel information from the virtual inner channel map; and completing the channel tuning by taking the performed channel tuning in advance if the both channel information are identical to each other.

The channel tuning method may further comprise re-performing the channel tuning to a channel based on the searched channel information from the application program if the searched channel information with which the application program has requested the channel tuning is not identical to the obtained channel information from the virtual inner channel map.

The channel tuning method may further comprise storing the channel information generated after the re-performing of the channel tuning in the virtual inner channel map and updating the virtual inner channel map.

The channel tuning method may further comprise storing the channel information generated after the performing the channel tuning in advance in the service context portion.

The application program may be a Java application.

According to another aspect of the present invention, there is provided a channel tuning method in a broadcast signal processing apparatus comprising a host including OCAP middleware for communication with an application program provided from a broadcasting station, and a memory for storing various programs and data, the channel tuning method comprising: creating a virtual inner channel map which has a structure similar to an inner channel map existing in the application program in the OCAP middleware; if a channel tuning key signal is input by a user, obtaining from the virtual inner channel map, channel information about a channel to be tuned in correspondence to the channel tuning key signal; and performing channel tuning using the channel information obtained by the virtual inner channel map.

The application program may be a Java application.

According to another aspect of the present invention, there is provided a broadcast signal processing apparatus comprising: a host, including OCAP middleware for communication with an application program provided from a broadcasting station; and a memory for storing various programs and data, wherein the host, if a channel tuning key signal is input by a user, transfers the input channel tuning key signal to the application program and a service context portion in the OCAP middleware, respectively; creates a virtual inner channel map in the service context portion, and obtains channel information about a channel to be tuned in correspondence to the channel tuning key signal from the virtual inner channel map; performs channel tuning in advance using the obtained channel information about the channel to be tuned; judges whether the channel information with which the application program has requested the channel tuning is identical to the channel information obtained from the virtual inner channel map; and completes the channel tuning by taking the performed channel tuning in advance if the channel information with which the application program has requested the channel tuning is identical to the channel information obtained from the virtual inner channel map.

The host may re-perform channel tuning to a channel based on the channel information from the application program if the channel information from the application program is not identical to the channel information obtained from the virtual inner channel map.

The host may store the channel information from the application program in the virtual inner channel map after re-performing the channel tuning to update the virtual inner channel map.

The host may store the channel information with which the channel tuning has been performed in advance in the service context portion after performing the channel tuning in advance.

The application program provided from a broadcasting station may be stored in the memory.

The application program may be a Java application.

According to another aspect of the present invention, there is provided a broadcast signal processing apparatus comprising: a host including OCAP middleware for communication with an application program provided from a broadcasting station; and a memory for storing various programs and data, the OCAP middleware including a virtual inner channel map having a structure similar to an inner channel map existing in the application program; and wherein the host obtains channel information about a channel to be tuned in correspondence to a channel tuning key signal from the virtual inner channel map and performs channel tuning using the channel information obtained by the virtual inner channel map, if the channel tuning key signal is input by a user.

The application program provided from a broadcasting station may be stored in the memory.

The application program may be a Java application.

BRIEF DESCRIPTION OF THE DRAWINGS

The above and other aspects and features of the present invention will become apparent and more readily appreciated from the following description of the exemplary embodiments, taken in conjunction with the accompanying drawings in which.

DETAILED DESCRIPTION OF EXEMPLARY EMBODIMENTS OF THE INVENTION

Figure 1:
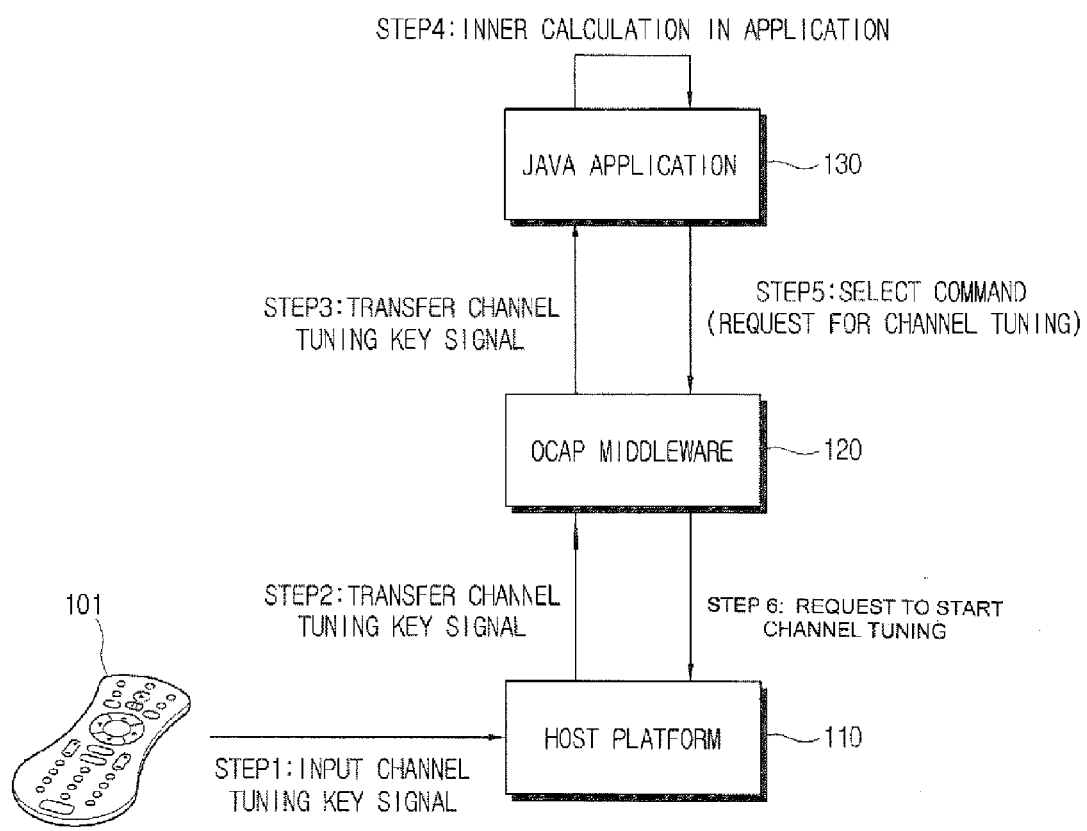
FIG. 1 is a flowchart view schematically showing a channel tuning method in a related art broadcast signal processing apparatus equipped with OCAP middleware.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

Figure 2:
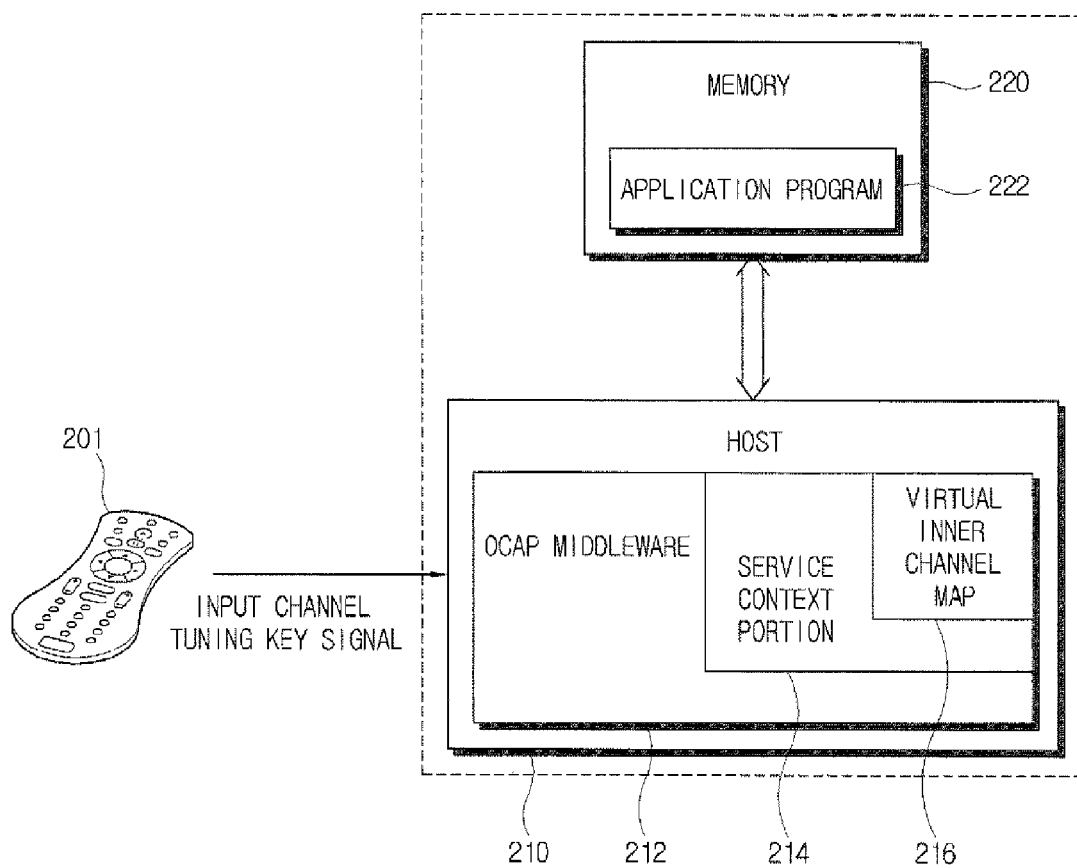
FIG. 2 is a block diagram schematically showing a configuration of a broadcast signal processing apparatus according to an exemplary embodiment of the present invention.

FIG. 2 is a block diagram schematically showing a configuration of a broadcast signal processing apparatus according to an exemplary embodiment of the present invention.

A broadcast signal processing apparatus (for example, a DTV, a Set Top Box, etc.) according to an exemplary embodiment of the present invention includes a host 210 including OCAP middleware 212 for communication with an application program 222 (for example, a Java application) provided from a broadcasting station, and a memory 220 for storing various programs and data.

If a channel tuning key signal is input through a remote controller 201 by a user, the host 210 transfers the input channel tuning key signal to the application program 222 and a service context portion 214 in the OCAP middleware 212, respectively. The host 210 creates a virtual inner channel map 216 in the service context portion 214, and obtains a channel information about a channel to be tuned in correspondence to the channel tuning key signal from the virtual inner channel map 216. The host 210 performs channel tuning in advance using the obtained channel information.

The host 210 judges whether or not the channel information with which the application program 222 has requested the channel tuning is identical to the channel information obtained from the virtual inner channel map 216, and completes final channel tuning by taking the previously performed channel tuning for the final channel tuning if the channel information obtained from the virtual inner channel map 216 is identical to the channel information with which the application program 222 has requested the channel tuning.

The host 210 re-performs channel tuning to a channel based on the channel information from the application program 222 if the channel information from application program 222 differs from the channel information obtained from the virtual channel map 216.

Also, the host 210 stores the channel information supplied from the application program 222 in the virtual inner channel map 216 to thereby update information in the virtual inner channel map 216 after re-performing the channel tuning.

In addition, the host 210 stores the channel information with which the channel tuning has been performed in advance in the service context portion 214 after performing the channel tuning in advance.

The application program 222 provided from a broadcasting station is stored in the memory 220. A Java application may be used as the application program 222.

A broadcast signal processing apparatus according to another exemplary embodiment of the present invention may be implemented by the following structure.

The OCAP middleware 212 includes a virtual inner channel map 216 having a structure similar to an inner channel map existing in the application program 222. If a channel tuning key signal is input by a user through remote controller 201, the host 210 obtains channel information about a channel to be tuned in correspondence to the channel tuning key signal from the virtual inner channel map 216 and performs channel tuning using the channel information obtained by the virtual inner channel map 216. The broadcast signal processing apparatus according to another exemplary embodiment of the present invention may be applied, wherein the structure of an inner channel map existing in the application program supplied from the broadcasting station is hardly altered.

A channel tuning method used in a broadcast signal processing apparatus according to an exemplary embodiment of the present invention will be described below with reference to FIGS. 2 and 3.

Figure 3:
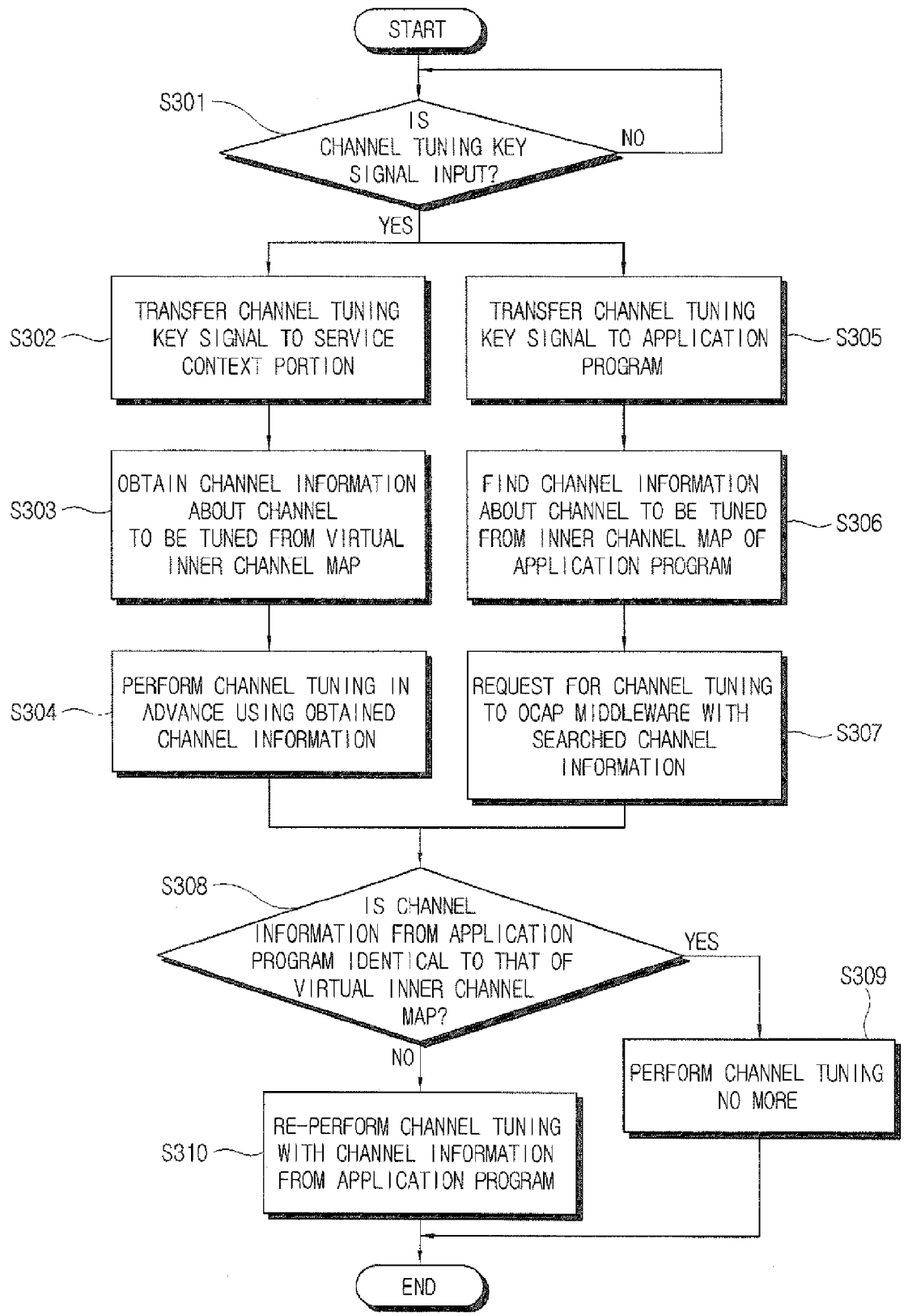
FIG. 3 is a flowchart view showing an executing process of a channel tuning method in a broadcast signal processing apparatus according to an exemplary embodiment of the present invention.

FIG. 3 is a flowchart view showing an executing process of a channel tuning method in a broadcast signal processing apparatus according to an exemplary embodiment of the present invention.

A channel tuning method is applied in a broadcast signal processing apparatus including the host 210 including the OCAP middleware 212 for communication with the application program (for example, a Java application) 222 provided from the broadcasting station, and the memory 220 for storing various programs and data. Referring to FIG. 3, if a channel tuning key signal is input through a remote controller 201 by a user (S301), the input channel tuning key signal is transferred to the application program 222 and the service context portion 214 in the OCAP middleware 212, respectively (S302 and S305).

Then, the virtual inner channel map 216 is created in the service context portion 214, and channel information about a channel to be tuned in correspondence to the channel tuning key signal is obtained from the virtual inner channel map 216 (S303). A process of creating the virtual inner channel map 216 does not mean a process of creating a channel map of a complete form at once from the beginning with given materials or data, but means a process of performing all the operations S301 to S310 repeatedly, thereby accumulating and updating the data. Therefore, channel tuning is performed by the same channel tuning method as the existing channel tuning method at the beginning of adopting the channel tuning method according to an exemplary embodiment of the present invention.

In this manner, if channel information about a channel to be tuned is obtained from the virtual inner channel map 216, channel tuning is performed in advance using the obtained channel information (S304). The channel information with which the channel tuning has been performed in advance is stored in the service context portion 214 after performing the channel tuning in advance.

Meanwhile, channel information about a channel to be tuned by the application program, which has received the channel tuning key signal, is searched (S306).

The OCAP middleware 212 is then requested to perform channel tuning using the searched channel information (S307).

Then, it is judged whether the channel information with which the application program 222 has requested the channel tuning is identical to the channel information obtained from the virtual inner channel map 216 (S308).

If both pieces of channel information are identical to each other, final channel tuning is completed by taking the previously performed pre-channel tuning for the final channel tuning (S309). In other words, channel tuning is not performed any more. Thus, since final channel tuning is completed by taking the previously performed channel tuning for the final channel tuning, processes of at least steps 3 through 5 of the related art channel tuning method are not necessary. Therefore, a channel tuning rate can be reduced in comparison with a related art channel tuning system.

If both pieces of channel information are not identical to each other, channel tuning is re-performed into a channel based on the channel information from the application program 222 (S310). The channel information is updated and stored in the virtual inner channel map 216 after re-performing the channel tuning. The reason for updating the information in the virtual inner channel map 216 as a process for creating the virtual inner channel map 216 is to create a more perfect channel map to perform channel tuning with a reduced tuning time, for a later channel tuning key signal input by a user.

Here, even if a channel which has been tuned in advance is not a channel which the application program 222 desires and thus the channel is again channel-tuned to a desired channel, the point in time when the channel tuning is re-performed is identical to the channel tuning point in time in the related art channel tuning system of FIG. 1. As a result, a problem that the channel tuning becomes slower than that of the related art channel tuning system does not occur.

Figure 4:
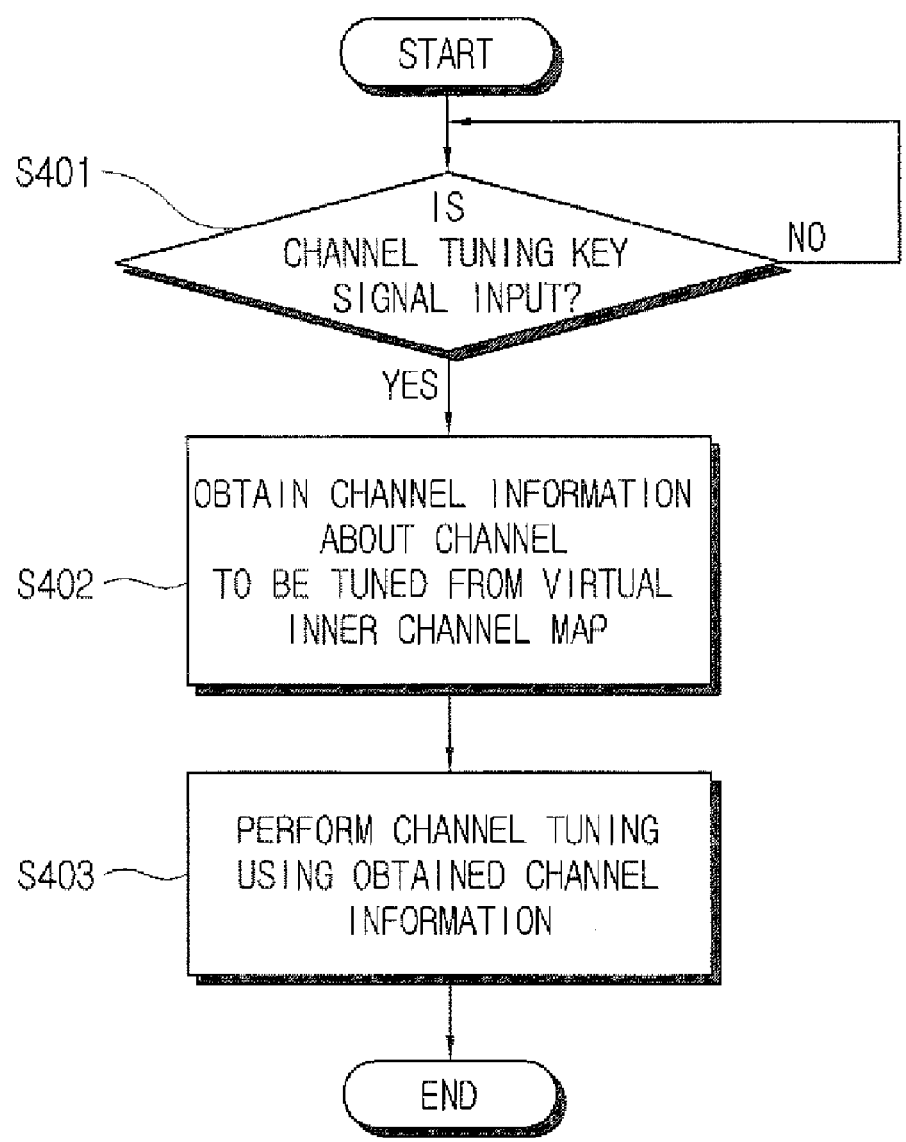
FIG. 4 is a flowchart view showing an executing process of a channel tuning method in a broadcast signal processing apparatus according to another exemplary embodiment of the present invention.

FIG. 4 is a flowchart view showing an executing process of a channel tuning method in a broadcast signal processing apparatus according to another exemplary embodiment of the present invention.

Referring to FIG. 4, a process of comparing channel information from the application program 222 with channel information from the virtual inner channel map 216 of the OCAP middleware is performed in the same manner as shown in FIG. 3. In FIG. 4, channel tuning is performed immediately by the channel information from the virtual inner channel map 216, and can be applied under the circumstances that structure of an inner channel map existing in the application program 222 provided from the broadcasting station is hardly altered. In other words, the virtual inner channel map 216 having a structure which is almost identical to that of the channel map existing in the application program 222 is created in advance, and stored in the OCAP middleware 212 in advance. If a channel tuning key signal is input by a user (S401), a channel information of a channel to be tuned corresponding to the channel tuning key signal is obtained from the virtual inner channel map 216 (S402). Then, channel tuning is performed using the channel information of the channel to be tuned (S403).

As described above, a special virtual inner channel map is created in an OCAP middleware and a channel information of a channel to be tuned is obtained from the virtual inner channel map to thus perform channel tuning in advance in the case that a channel tuning key signal is input. Therefore, the present invention provides a channel tuning method in a broadcast signal processing apparatus that can further reduce a channel tuning time in comparison with that of a Java application based channel tuning system.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A channel tuning method in a broadcast signal processing apparatus comprising a host including Open Cable Application Platform (OCAP) middleware for communication with an application program provided from a broadcasting station, and a memory for storing various programs and data, the channel tuning method comprising:
    when a channel tuning key signal is input by a user, transferring, by the host, the input channel tuning key signal simultaneously to both the application program without passing through the OCAP middleware and a service context portion in the OCAP middleware;
    creating, by the host, a virtual inner channel map which is in the service context portion and has a structure similar to an inner channel map existing in the application program, and obtaining, by the host, a channel information about a channel to be tuned in correspondence to the channel tuning key signal from the virtual inner channel map;
    performing, by the host, channel tuning in advance using the obtained channel information about the channel to be tuned;
    searching, by the application program, the channel information about the channel to be tuned by the application program, which has received the channel tuning key signal;
    receiving, by the host, a request from the application program for the OCAP middleware to perform channel tuning with channel information about the channel to be tuned that was identified in the inner channel map existing in the application program;
    judging, by the host, whether the searched channel information with which the application program has requested the channel tuning is identical to the obtained channel information from the virtual inner channel map; and
    completing, by the host, the channel tuning by taking the performed channel tuning in advance if the channel information obtained from the virtual inner channel map is identical to the searched channel information with which the application program has requested the channel tuning.

2. The channel tuning method of claim 1, further comprising re-performing the channel tuning to a channel based on the obtained channel information from the application program if the channel information obtained from the application program is not identical to the channel information from the virtual inner channel map.

3. The channel tuning method of claim 2, further comprising storing the channel information generated after the re-performing of the channel tuning in the virtual inner channel map and updating the virtual inner channel map.

4. The channel tuning method of claim 1, further comprising storing the channel information generated after performing the channel tuning in advance in the service context portion.

5. The channel tuning method of claim 1, wherein the application program is a Java application.

6. A broadcast signal processing apparatus comprising:
    a host including Open Cable Application Platform (OCAP) middleware for communication with an application program provided from a broadcasting station; and
    a memory which stores various programs and data,
    wherein the host is configured to:
    transfer, when a channel tuning key signal is input by a user, the input channel tuning key signal simultaneously to both the application program without passing through the OCAP middleware and transfer the channel tuning key signal to a service context portion in the OCAP middleware;
    create a virtual inner channel map which is in the service context portion and has a structure similar to an inner channel map existing in the application program, and obtain channel information about a channel to be tuned in correspondence to the channel tuning key signal from the virtual inner channel map;
    perform a channel tuning in advance using the obtained channel information about the channel to be tuned;
    receive a request from the application program for the OCAP middleware to perform channel tuning with channel information about the channel to be tuned that was searched in the inner channel map existing in the application program
    judge whether the channel information with which the application program has requested for the channel tuning is identical to the channel information obtained from the virtual inner channel map; and
    complete the channel tuning by taking the performed channel tuning in advance if the channel information obtained from the virtual inner channel map is identical to the channel information with which the application program has requested the channel tuning.

7. The broadcast signal processing apparatus according to claim 6, wherein, if the channel information obtained from the virtual inner channel map is not identical to the channel information with which the application program has requested the channel tuning, the host is further configured to re-perform channel tuning to a channel based on the channel information from the application program.

8. The broadcast signal processing apparatus according to claim 7, wherein, the host is further configured to store the channel information from the application program in the virtual inner channel map after re-performing the channel tuning to update the virtual inner channel map.

9. The broadcast signal processing apparatus according to claim 6, wherein the host is further configured to store the channel information with which the channel tuning has been performed in advance in the service context portion after performing the channel tuning in advance.

10. The broadcast signal processing apparatus according to claim 6, wherein the application program provided from a broadcasting station is stored in the memory.

11. The broadcast signal processing apparatus according to claim 10, wherein the application program is a Java application.

* * * * *